(12) United States Patent
Lanzinger

(10) Patent No.: US 6,978,589 B2
(45) Date of Patent: Dec. 27, 2005

(54) REEL FOR A HARVESTING ASSEMBLY

(75) Inventor: Bernhard Lanzinger, Bockweiler (DE)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 11/031,621

(22) Filed: Jan. 8, 2005

(65) Prior Publication Data

US 2005/0178102 A1  Aug. 18, 2005

(51) Int. Cl.[7] .............................................. A01D 57/02
(52) U.S. Cl. ........................................................ 56/220
(58) Field of Search ............................ 56/219, 220, 221, 56/222, 223, 224, 225, 226, 227, 344, 345, 56/350, 351, 354, 364–367, 370, 375–380, 56/384

(56) References Cited

U.S. PATENT DOCUMENTS

| | | |
|---|---|---|
| 758,241 A * | 4/1904 | Friend et al. ................. 56/227 |
| 1,088,098 A * | 2/1914 | Saunders et al. ............. 56/223 |
| 1,715,306 A * | 5/1929 | Peterson ....................... 56/220 |
| 3,145,520 A | 8/1964 | Hume et al. .................. 56/220 |
| 3,217,473 A * | 11/1965 | Lawrie ........................ 56/14.4 |
| 3,512,348 A * | 5/1970 | Fritz et al. .................... 56/226 |
| 3,902,305 A | 9/1975 | Gibson et al. ................ 56/220 |
| 6,397,573 B2 * | 6/2002 | Majkrzak ..................... 56/220 |
| 6,591,598 B2 * | 7/2003 | Remillard et al. ............ 56/226 |
| 6,662,541 B2 * | 12/2003 | Meier ........................... 56/366 |

* cited by examiner

Primary Examiner—Heather Shackelford
Assistant Examiner—Nathan Mammen

(57) ABSTRACT

A harvesting assembly includes a platform reel. The reel includes bat tubes extending longitudinally across the length of the reel. The bat tubes are mounted at their outer ends to opposed spider support elements each having a center rotatable hub. The bat tubes carry tines for feeding harvested crop to the harvesting platform. The interior of the reel is free of supporting elements such as a center tube extending across the length of the reel. Perimeter struts connect adjacent bat tubes and provide a supporting framework together with the bat tubes for the reel.

5 Claims, 2 Drawing Sheets

REEL FOR A HARVESTING ASSEMBLY

BACKGROUND OF THE INVENTION

This invention pertains to a platform reel for a harvesting assembly with bat tubes that extend across the width of the reel. The bat tubes are supported by spider supports at their outer ends and by perimeter struts at various longitudinal positions along the bat tubes. The interior space between the bat tubes does not contain a longitudinal supporting element such as a center tube that normally extends over the length of the reel.

Harvesting platform reels are utilized on harvesting assemblies, particularly on sickle mechanisms, in order to feed standing crop to a cutter bar and harvested crop to a transverse conveyor device. U.S. Pat. No. 3,145,520 describes a reel with bat tubes and tines mounted thereon, which are supported on spider-type carrying elements distributed over the width of the reel. The bat tubes are rotatably supported on the spider-type carrying elements and are rotated by means of an off-center driving mechanism to orient the tines in the desired direction. A center tube extends across the center axis of the reel and provides the reel with longitudinal stability. However, the center tube is a disadvantage because the tube increases the weight of the reel and obstructs the operator's view of the sickle mechanism, particularly the cutter bar and regions situated in front of the cutter bar.

U.S. Pat. No. 3,902,305 describes a mower with a flexible cutting belt that cuts standing crop. A reel positioned above the cutting belt feeds the crop to the cutting belt. This reel includes spider-type carrying elements on the end faces and bat tubes extending between. Because the operating width of the mower is relatively narrow, the central tube can be eliminated. However, the unstable structure of the unsupported reel would not be suitable for larger operating widths such as on harvesting platforms because of stability risks.

SUMMARY OF THE INVENTION

Thus, the present invention is directed to providing a sturdy and stable structure for a lightweight and open center reel for a harvesting platform.

The invention includes a reel having a framework that includes longitudinal bat tubes and struts around the reel perimeter that connect adjacent bat tubes. This framework provides sufficient stability so that additional supporting elements such as a center tube that normally extends across the length of the reel can be eliminated from the interior space between the bat tubes. The structure of the present invention results in a reel that is relatively lightweight and provides the operator an unobstructed view of the harvesting assembly.

BRIEF DESCRIPTION OF THE DRAWINGS

The invention is illustrated in the figures and described in greater detail below.

DETAILED DESCRIPTION OF THE INVENTION

Figure 1:
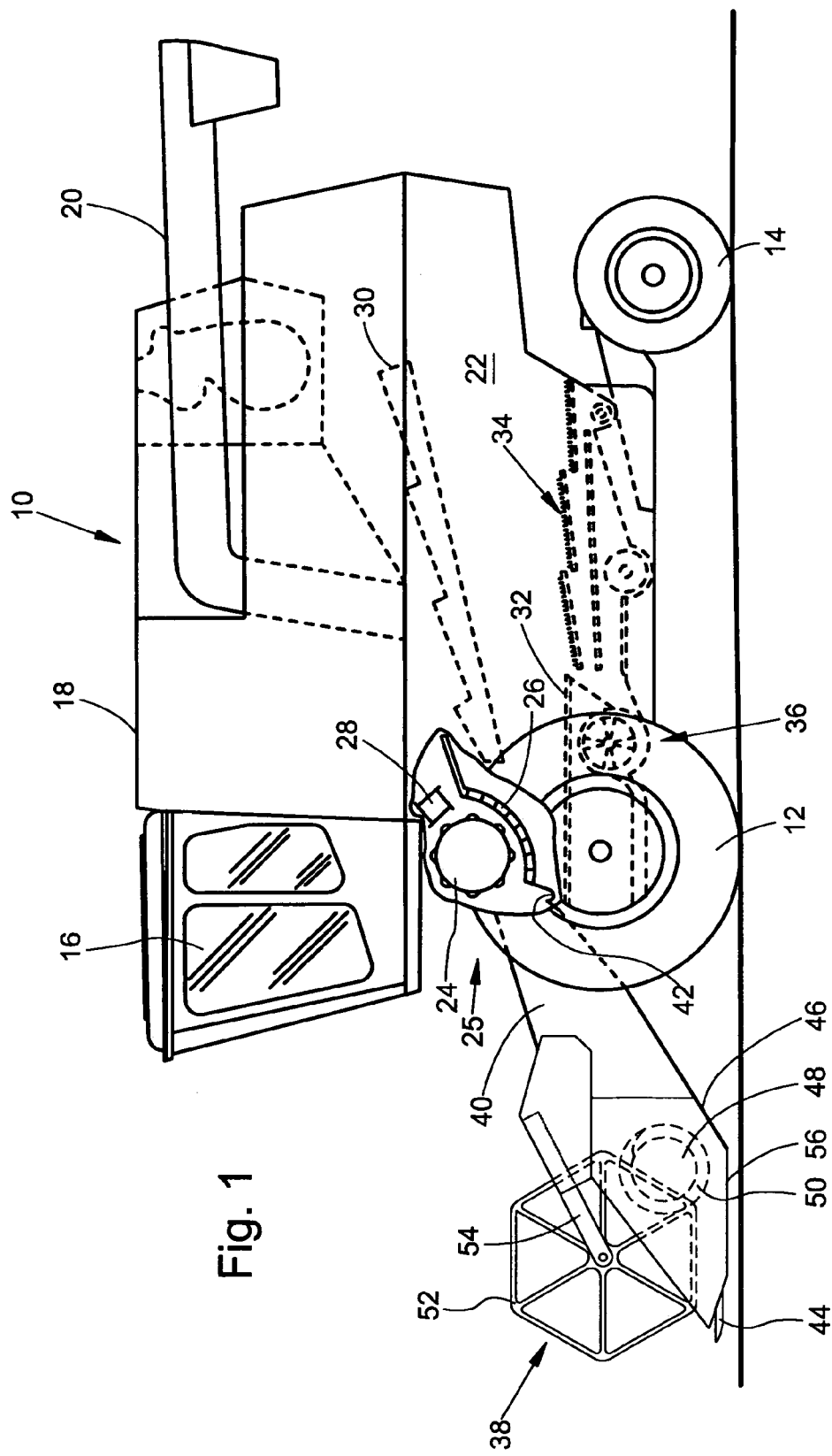
FIG. 1 shows a combine-harvester with a harvesting assembly that contains a platform reel according to the present invention.

A combine-harvester 10 shown in FIG. 1 is carried on driven front wheels and steerable rear wheels 12 and 14, respectively. An operator cab 16 is provided from which an operator is able to operate the combine-harvester. A grain tank 18 is situated behind the operator cab 16 and a delivery tube 20 can deliver the grain outward. The grain tank 18 is supported on a frame 22. The harvested crop is separated into its larger and smaller fractions by means of a threshing drum 24, a threshing basket 26 and a turning drum 28, for example. The harvested crop is additionally separated on ensuing straw rockers 30, as well as a preparatory base 32 and screens 34, so that the threshed-out fraction of the crop is ultimately conveyed into the grain tank 18 while the larger constituents of the harvested crop are deposited on the ground by the straw rockers 30. Lightweight residuals such as chaff are blown off the screens 34 and onto the ground by a blower 36. The standing crop that is picked up by the harvesting assembly 38 is fed into the threshing drum 24 by an intake channel 40 having a slope conveyor with a rock catcher 42.

In the embodiment shown, the harvesting assembly 38 includes a sickle mechanism, on the front side of which a cutter bar 44 is arranged so that the cutter mechanism is able to move back and forth. A frame 46 for the harvesting assembly 38 also carries a conveyor auger 48 with windings 50 that revolve about a central auger tube. A harvesting platform reel 52 feeds the standing crop to the cutter bar 44 and the conveyor auger 48 and is positioned above and in front of the conveyor auger 48. The harvesting platform reel 52 is mounted to the frame 46 by reel-carrying arms 54 on two opposed ends. The reel is driven about its longitudinal axis by a mechanical or hydraulic drive so that the reel turns in the counterclockwise direction as referred to in FIG. 1.

Figure 2:
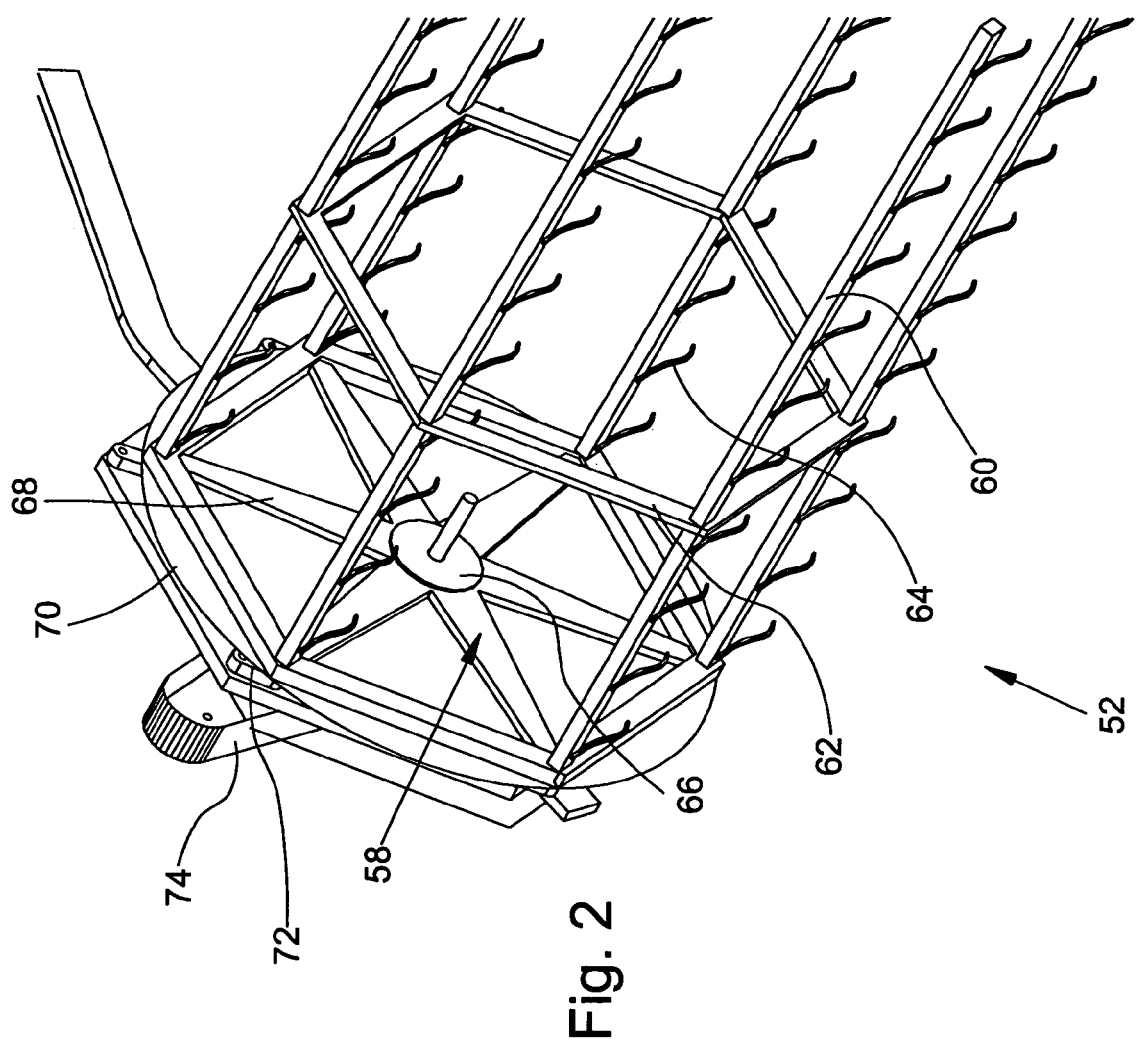
FIG. 2 is a perspective representation of the reel according to the present invention.

FIG. 2 is a perspective representation of the right end section of the reel 52, as referenced relative to the driving direction of the combine harvester 10. The reel 52 has a spider support element 58 on each end face, a plurality of tubular bat tubes 60 (six are shown), a polygon arrangement of perimeter support struts 62 (a hexagonal arrangement is depicted) and a plurality of crop directing tines 64 mounted on the bat tubes 60. The spider type support element 58 is provided on both ends of the reel 52 and has a predetermined number of arms 68 (six are depicted) that radially extend outward from a center hub 66. The bat tubes 60 extend axially across the entire width of the reel 52 between the outer ends of the arms 68 of the spider type support elements 58. The bat tubes are integrally constructed or can be assembled from component elements that extend over a part of the reel length and are connected or joined to one another. The bat tubes 60 are rotatably supported on the hub 60 by the spider arms 68. The bat tubes can pivot relative to the spider support elements 58 and the support struts 62. The struts 62 are spaced axially apart from the spider support elements 58.

A plate cam 70 is provided adjacent to the spider-type support element 58 on one side (the right side is depicted) of the reel 52. The axis of rotation of the cam plate cam is arranged off-center with respect to the axis of the hub 66. The spider support elements 58 and bat tubes 60 are connected to respective corners of the plate cam 70 by control levers 72 that operate as a pivot drive. Consequently, the bat tubes 60 rotate or pivot relative to the spider arms 68 when the reel of the combine-harvester is in operation. The hub 66, and thus the spider arms 68 of the spider-type support elements 58, are rotated by a drive mechanism 74. Thus, the tines 64 are oriented approximately downward as shown in FIG. 2 over the entire rotating range of the reel. A downward orientation of the tines results in improved feeding of the harvested crop to the cutter bar 44 and to the conveyor auger 48.

The reel 52 of the present invention does not contain or need any supporting elements in the interior of the reel 52. The hubs 66 of the spider type support elements 58, consequently, are not connected by a central tube or similar supporting elements, such as thin struts or the like that extend across the longitudinal or axial width of the reel 52. The open space in the center of the reel according to the present invention provides a lighter weight reel than reel embodiments equipped with a central tube. Also the operator's view of the harvesting assembly 38 is not obstructed by a central tube. This provides the operator in the operator's cabin 16 with a significantly improved view of the cutter bar 44 and the un-harvested standing crop situated in front of the harvesting assembly 38.

The struts 62 around the perimeter of the reel provide structural stability for a harvesting platform reel 52 that may have a width of 6 m to 9 m or larger. The perimeter struts 62 connect adjacent bat tubes 60 and form a polygon shape. Adjacent struts 62 are connected to the bat tubes and to one another such that the angle between the struts 62 cannot change. Diagonal connecting elements that are spaced apart from the bat tubes 60 may be provided for this purpose. The struts 62 can be manufactured from an integral workpiece or in the form of a welded construction. The struts 62 and the spider-type support elements 58 represent the only elements that support the bat tubes 60. The struts 62 and the bat tubes 60 have sufficient structural dimensions and form a framework to provide the required stability for the reel 52. The connection between the struts 62 and the bat tubes 60 allow the bat tubes 60 to pivot while preventing all other degrees of motion. The struts 62 are distributed over the width of the reel 52 at suitable longitudinal intervals.

The number of bat tubes 60 can vary and may include from three (3) to eight (8) tubes. Thus, the respective number of perimeter struts 62 would change accordingly. The resulting configuration of the strut framework around the perimeter of the reel would thus be a polygon such as a triangle, square, pentagon, etc.

I claim:

1. A reel for a harvesting assembly comprising:
   two opposed spider support elements, each supported for rotation by a center hub;
   a plurality of bat tubes supported by the spider support elements and extending between the spider support elements, each bat tube being spaced apart peripherally from a pair of adjacent bat tubes;
   a plurality of tines on each bat tube for conveying harvested crop; and
   a plurality of perimeter struts, each strut connecting one of the bat tubes to one of the peripherally adjacent bat tubes to form a supporting framework for the bat tubes wherein the reel has an interior which is free of supporting elements, the struts being spaced axially apart from the spider support elements.

2. The reel according to claim 1, wherein the bat tubes are rotatably supported relative to the center hubs and wherein the bat tubes and tines are pivoted by rotary control levers.

3. The reel according to claim 2 wherein the tines pivot substantially vertically down as the hub rotates the spider support elements.

4. The reel according to claim 1 wherein each perimeter struts is connected exclusively to two peripherally adjacent bat tubes.

5. The reel according to claim 1 wherein the axial width of the reel exceeds 6 meters.

* * * * *